United States Patent
Park et al.

(10) Patent No.: US 11,294,260 B2
(45) Date of Patent: Apr. 5, 2022

(54) VIEW SHUTTERS WITH SLIDER MAGNETS

(71) Applicant: Hewlett-Packard Development Company, L.P., Spring, TX (US)

(72) Inventors: Chan Woo Park, Spring, TX (US); Chyun Nan Liu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/479,750

(22) PCT Filed: Feb. 12, 2018

(86) PCT No.: PCT/US2018/017771
§ 371 (c)(1),
(2) Date: Jul. 22, 2019

(87) PCT Pub. No.: WO2019/156683
PCT Pub. Date: Aug. 15, 2019

(65) Prior Publication Data
US 2021/0333686 A1      Oct. 28, 2021

(51) Int. Cl.
*G03B 11/04* (2021.01)
*G06F 1/16* (2006.01)

(52) U.S. Cl.
CPC .......... *G03B 11/043* (2013.01); *G06F 1/1686* (2013.01)

(58) Field of Classification Search
None
See application file for complete search history.

(56) References Cited

U.S. PATENT DOCUMENTS

| D669,112 S | 10/2012 | Gustaveson |
| 8,531,832 B2 * | 9/2013 | Wu .............. G06F 1/1686 361/679.55 |
| 9,430,106 B1 | 8/2016 | Olson et al. |
| 9,465,276 B2 | 10/2016 | Jonsson et al. |
| 9,535,310 B2 | 1/2017 | Gonzalez et al. |
| 9,829,770 B1 | 11/2017 | Gustaveson |
| 2010/0102979 A1 * | 4/2010 | Huang ............ G06F 1/1686 340/686.1 |

(Continued)

FOREIGN PATENT DOCUMENTS

| CN | 205512956 U | 8/2016 |
| CN | 107580099 | 1/2018 |

(Continued)

OTHER PUBLICATIONS

Spishutter—Slim—Gold (New).

*Primary Examiner* — Clayton E. LaBalle
*Assistant Examiner* — Diana Hancock
(74) *Attorney, Agent, or Firm* — HPI Patent Department (57) ABSTRACT

In an example, a view shutter may include a slider to move along a bezel of an electronic device. The slider may move along the bezel between an open position and a closed position. An example view shutter may also include a camera aperture disposed on the slider. The camera aperture may be aligned with a camera disposed behind the slider if the slider is in the open position, and the slider may obstruct a view of such a camera if the slider is in the closed position. Additionally, an example view shutter may also include a slider magnet disposed on the slider, a first holding magnet coupled to the bezel, and a second holding magnet coupled to the bezel.

15 Claims, 6 Drawing Sheets

(56) References Cited

U.S. PATENT DOCUMENTS

| | | | |
|---|---|---|---|
| 2011/0115924 A1 | 5/2011 | Yu et al. | |
| 2012/0212650 A1 | 8/2012 | Fukuda | |
| 2015/0009399 A1 | 1/2015 | Jonsson et al. | |
| 2015/0378455 A1* | 12/2015 | Immel | G06F 3/03545 345/179 |
| 2016/0049979 A1 | 2/2016 | Grouwstra | |
| 2016/0161830 A1 | 6/2016 | Gonzalez et al. | |
| 2017/0329206 A1* | 11/2017 | Gustaveson, II | H04N 5/2257 |
| 2018/0004068 A1* | 1/2018 | Chen | G03B 11/041 |
| 2019/0102519 A1* | 4/2019 | Durand | A61B 90/94 |
| 2019/0179212 A1* | 6/2019 | Leimer | G03B 11/043 |
| 2021/0200061 A1* | 7/2021 | Kanas | G03B 11/043 |

FOREIGN PATENT DOCUMENTS

| | | |
|---|---|---|
| RU | 2065354 C1 | 8/1996 |
| TW | 201126309 | 8/2011 |
| TW | 201327011 A | 7/2013 |
| WO | 2016/153512 A1 | 9/2016 |

\* cited by examiner

VIEW SHUTTERS WITH SLIDER MAGNETS

BACKGROUND

Electronic devices may include cameras for increased functionality and convenience for the end user. Such cameras may be utilized by the user to capture images and/or videos. In some situations, electronic devices may include cameras that are front-facing, or, in other words, may be disposed on the same side of the electronic device as a display or other user interface in order to capture images and/or videos of the user.

DETAILED DESCRIPTION

Electronic devices, for example, notebook computers, desktop computers, monitors, tablets, mobile phones, and other electronic devices, may include cameras for increased functionality and convenience for the end user. Such cameras may be utilized by the user to capture images and/or videos. In some situations, electronic devices may include cameras that are front-facing, or, in other words, may be disposed on the same side of the electronic device as a display or other user interface, in order to capture images and/or videos of the user. Concerns have arisen about the possibility of unwelcome remote access to electronic devices, for example, through networks or over the Internet. Additional concerns have arisen about the possibility of such unwanted access to electronic devices including discrete and unwanted access to such front-facing cameras to clandestinely capture images or videos, without the knowledge of the user. Therefore, it may be desirable for a user to avoid such invasions of privacy by physically blocking the camera, thereby making it impossible for a third party to secretly capture images and/or video with the camera, even if such third party is able to remotely access the electronic device.

In some situations, users have blocked front-facing cameras using simple techniques, such as applying tape to the camera lens. Such solutions, while easy, may not be very durable and/or long-lasting, and may also have negative effects on the aesthetics of the device. In other situations, electronic devices may have an integrated shutter or blocker for the camera that a user may be able to actuate when desiring to ensure their privacy. Often times, these integrated solutions involve a physical shutter disposed on the exterior of a display which may be slid by a user into place over a front-facing camera lens. Such solutions can be difficult to slide or actuate by hand, in some situations, and may also negatively affect the industrial design or aesthetics of the display and/or the overall electronic device. Additionally, with the shutter or blocker disposed on an exterior surface, it may be possible to accidentally bump or hit the shutter to uncover the camera without realizing it, thereby exposing the user to secret image capture and/or recording. Further, such an external sliding shutter or blocker can be difficult to implement on electronic devices or displays having a cover glass extending over a bezel or other area in which the camera may be disposed. Therefore, it is further desirable to not only have a physical shutter or blocker for a front-facing camera, but for it to be integrated within the electronic device, instead of on an external surface, thereby preserving the industrial design and aesthetics of the device. Also, it may be desirable for the shutter or blocker to be easily actuated, yet to also make it more difficult to accidentally actuate or uncover the camera.

Examples herein provide view shutters which may be disposed and integrated within an electronic device instead of on an exterior surface or bezel. Further, example view shutters disclosed herein include sliders with magnets so as to provide simple and easy actuation of the view shutters. Additionally, example view shutters disclosed herein may be magnetically-held in position so as to avoid inadvertent actuation or uncovering of the camera.

Figure 1A:
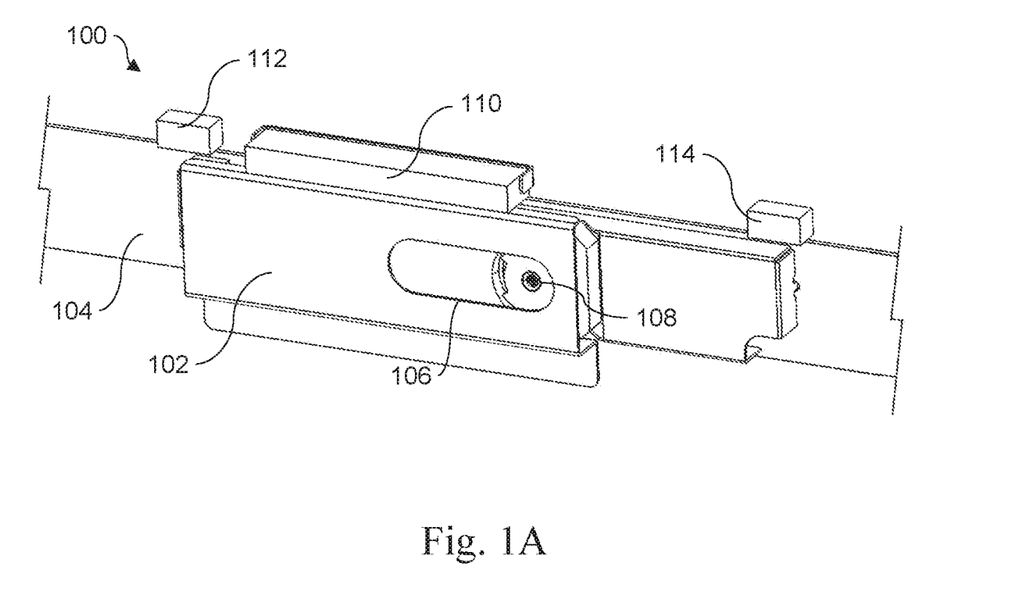
FIG. 1A is a perspective view of an example view shutter with a slider magnet.

Referring now to FIG. 1A, a perspective view of an example view shutter 100 is illustrated. Example view shutter 100 may include a slider 102 to move along a bezel 104. Note, while referred to here as a bezel, element 104 may be any component attached to or fixed relative to a bezel of an electronic device, or another component near a camera. Such element 104 is hereinafter referred to as a bezel for simplicity. The slider 102 may move along bezel 104 between an open position, illustrated in FIG. 1A, and a closed position, illustrated in FIG. 1B. Example view shutter 100 may also include a camera aperture 106 disposed on the slider 102. The camera aperture 106 may be aligned with a camera 108 disposed behind the slider 102 if the slider 102 is in the open position, and, conversely, the slider 102 may obstruct a view of such a camera 108 if the slider 102 is in the closed position. The camera 108 may be any type of camera used in an electronic device, e.g., a front-facing camera, that is capable of capturing images and/or video. In other situations, the camera may be a back-facing, or world-facing camera and may be facing in a direction other than towards a user. In such examples, the term "bezel" may refer to any bezel, cover, case, housing, or other structure or portion thereof surrounding or disposed near such other types of cameras. Additionally, example view shutter 100 may also include a slider magnet 110 disposed on the slider 102, a first holding magnet 112 disposed near the open position and/or coupled to the bezel, and a second holding magnet 114 disposed near the closed position and/or coupled to the bezel.

Referring to FIG. 1A in more detail, the slider 102 may be a rigid or semi-rigid plate, sheet, bar, panel, or other element that is able to move between an open and closed position. In some implementations, the slider 102 may be or may have a portion that is planar or substantially planar so as to be able to slide in front of a camera lens to block a view of such a camera, or to otherwise prevent light from entering the camera lens. In yet other implementations, the slider 102 may have a suitable geometry or structure so as to be able to slide in between two adjacent panels or components, e.g. a bezel on one side and a camera and surrounding components on the other side. In some implementations, the slider 102 may be made of a metallic material, e.g., a sheet metal, or, in other examples, the slider 102 may be made of a polymer material and/or be manufactured through injection molding.

The camera aperture 106 may be an opening, cutout, or window in the slider 102. While illustrated as an oblong or oval-shaped opening in the Figures, it should be noted that the camera aperture 106 may be another shape, for example a circular, or rectangular opening. In some implementations, the camera aperture 106, instead of being a closed cutout or window in a central portion of the slider as in other examples, may instead be an open cutout into a side or edge of the slider, i.e., may be open on one side or additional sides. In some implementations, the camera aperture 106 may be sized sufficiently to not impede the function or view of the camera when the slider 102 is disposed in the open position.

In some implementations, the slider magnet 110 may be any type of magnetic or ferromagnetic material, or a material or component that produces a magnetic field. In further implementations, the slider magnet 110 may be attracted to or may comprise a magnetic material such as iron, nickel, cobalt, rare-earth magnets or metals, alloys thereof, or another magnetic material. In yet further implementations, the slider magnet 110 may be a bar magnet having a north pole on one end, and a south pole on another end. In other implementations, the slider magnet may be an electromagnet.

In some implementations, the slider magnet 110 may be disposed on the slider 102 such that movement of the slider magnet 110 in one direction causes movement of the slider 102 in the same direction. In further implementations, the slider magnet 110 may be fixed to the slider 102, or, in other implementations, may be disposed on the slider 102 such that it is movable relative to the slider 102. In further implementations, the slider magnet 110 may be fixed to a side of the slider 102, or, in other implementations, the slider magnet 110 may be fixed to another portion of the slider 102. In yet further implementations, the slider magnet 110 may be oriented such that one magnetic pole is disposed towards one end of the slider 102, and the other magnetic pole is disposed towards another or opposite end of the slider 102.

The first holding magnet 112 and the second holding magnet 114 may also be constructed of a magnetic material, or include a material or component that produces a magnetic field. In some implementations, the first holding magnet 112 and the second holding magnet 114 may be constructed of the same or similar material to that of the slider magnet 110. In other implementations, the first holding magnet 112 and the second holding magnet 114 may be constructed of a different magnetic material than that of the slider magnet 110. In some implementations, the first holding magnet 112 and the second holding magnet 114 may each be a bar magnet having a north pole on one end and a south pole on another end.

The first holding magnet 112 and the second holding magnet 114 may be disposed near the open position and the closed position, respectively. The first holding magnet 112 and the second holding magnet 114 may be disposed sufficiently near the respective open position and closed position such that each of the first holding magnet 112 and the second holding magnet 114 may magnetically hold the slider magnet 110, and thus the slider 102, in the respective open position or closed position through magnetic force. In other words, the first holding magnet 112 may hold or retain the slider 102 in the open position through magnetic attraction to the slider magnet 110 if the slider 102 is disposed in the open position. Similarly, the second holding magnet 114 may hold or retain the slider 102 in the closed position through magnetic attraction to the slider magnet 110 if the slider 102 is disposed in the closed position. Thus, the first holding magnet 112 and the second holding magnet 114 may both be oriented so as to both be magnetically attracted to the slider magnet 110. In some implementations, such an attraction may be accomplished by the first holding magnet 112 having a polarity at an end closest to the slider magnet 110 that is opposite to a polarity of a portion of the slider magnet 110 that is closest to the first holding magnet 112. Similarly, the second holding magnet 114 may have a polarity at an end closest to the slider magnet 110 that is opposite to a polarity of a portion of the slider magnet 110 that is closest to the second holding magnet 114. As such, as illustrated in FIG. 1A, the first holding magnet 112 may be holding or retaining the slider 102 in the open position such that the slider 102 cannot slip or slide out of the open position, for example, accidentally. Such an orientation is described further below with reference to FIGS. 2A-2B.

In some implementations, the first holding magnet 112 and the second holding magnet 114 may each be disposed on or attached to the bezel 104, or another component coupled to or near the bezel 104. In further implementations, the first holding magnet 112 and the second holding magnet 114 may be fixed to the bezel 104 or such other component, or fixed in placed relative to the bezel 104 or such other component such that the slider 102 and the sliding magnet 110 may move or slide relative to the first holding magnet 112 and the second holding magnet 114.

Figure 1B:
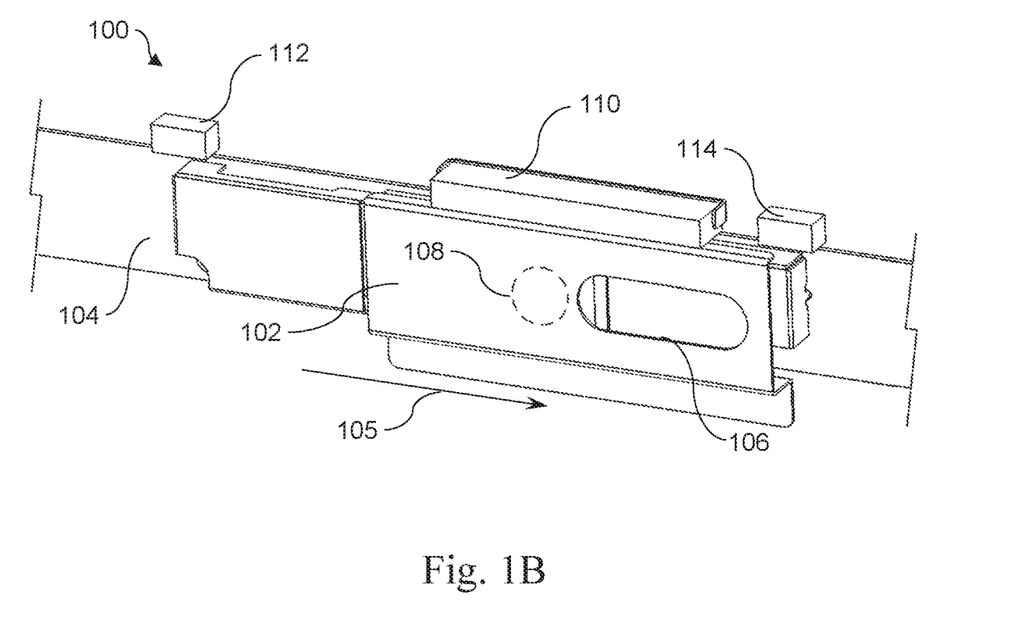
FIG. 1B is a perspective view of an example view shutter with a slider magnet.

Referring now to FIG. 1B, a perspective view of the example view shutter 100 is illustrated wherein the slider 102 has been moved or transitioned from the open position to the closed position along example direction 105. As such, the camera aperture 106 has been moved out of alignment with the camera 108, thereby blocking the camera 108, as the slider 102 has been moved from the open position to the closed position. As such, the camera 108 is illustrated in phantom lines since it is no longer visible and is hidden behind the slider 102. In the illustrated position, and as described above, the second holding magnet 114 may be holding the slider 102 in the closed position so that it cannot inadvertently move out of the closed position.

It should be noted that, while the herein description refers to the slider 102 as being held in either the open or closed positions by respective holding magnets, other holding techniques are also contemplated. For example, in some implementations, the slider 102 may be held in either the open or closed positions by a mechanical detent, clip, snap, or other mechanical component.

Figure 2A:
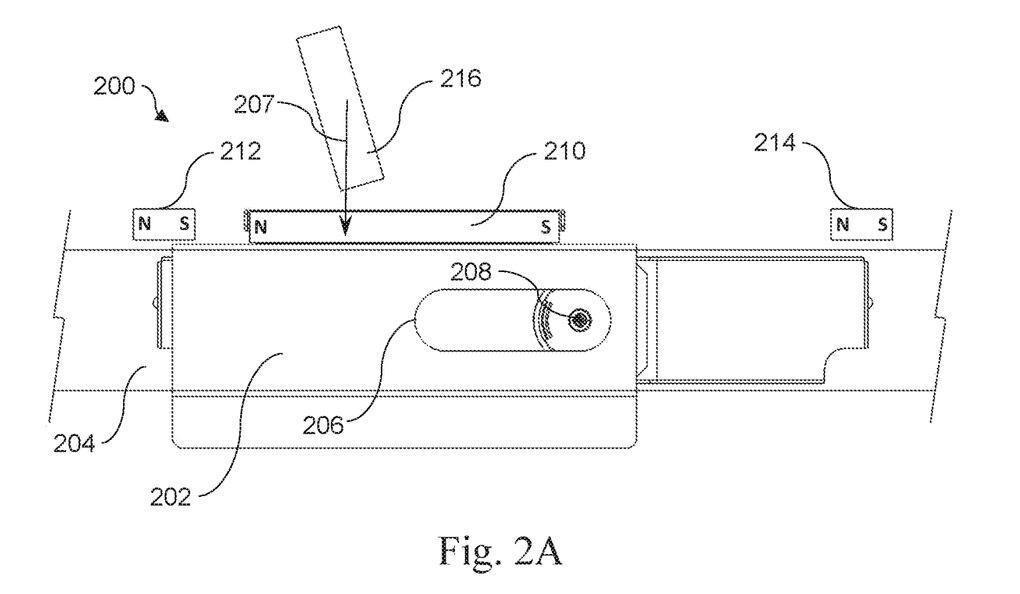
FIG. 2A is a front view of an example view shutter with a slider magnet.
Figure 2B:
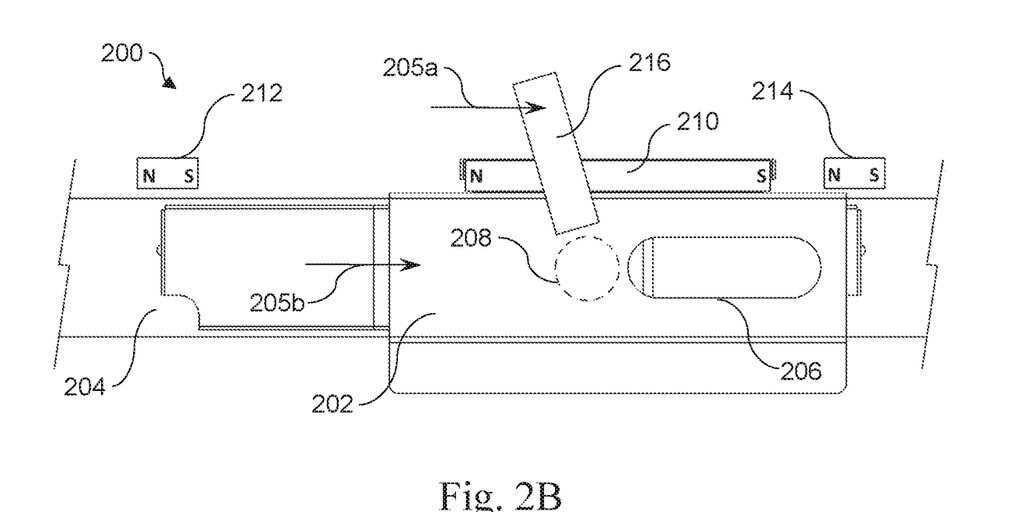
FIG. 2B is a front view of an example view shutter with a slider magnet.

Referring now to FIGS. 2A-2B, front views of an example view shutter 200 are illustrated in the open position (FIG. 2A) and the closed position (FIG. 2B). Example view shutter 200 may be similar to example view shutter 100, described above. Further, the similarly-named elements of example view shutter 200 may be similar in function and/or structure to the respective elements of example view shutter 100, as they are described above. Example view shutter 200 may have a slider 202 to move along a bezel 204. As noted above, bezel 204 may not be an actual bezel for a display, but in fact be a supporting element, frame, housing, or another type of component that is coupled to or near a bezel. Further, view shutter 200 may also include a camera aperture 206 on the slider 202, a slider magnet 210 disposed on the slider 202, and a first and second holding magnet 212 and 214, respectively. The slider 202 may be movable between an open position, exposing a camera 208 through the camera aperture 206, and a closed position, blocking the camera 208, or blocking light thereto. Accordingly, the camera 208 is illustrated in phantom lines in FIG. 2B, as it is hidden by the slider 202.

As described above regarding FIGS. 1A-1B, the first and second holding magnets 212 and 214, respectively, may be oriented so as to both be magnetically attracted to the slider magnet 210. Specifically, in some implementations, each of the first holding magnet 212 and the second holding magnet 214 may be bar magnets or be magnets with a north pole (N) on one end, and a south pole (S) on the other end. Additionally, the slider magnet 210 may also be a magnet having a north pole (N) and a south pole (S). In the illustrated example, the first holding magnet 212 is disposed or fixed relative to the bezel 204, or fixedly coupled to the bezel 204, with the its south pole disposed closer to the slider magnet 210 than its north pole. As such, the slider magnet 210 is disposed or fixed on the slider 202 with its north pole closer to the first holding magnet 212 than its south pole. As such, when the slider 202 is disposed in the open position as illustrated in FIG. 2A, the south pole of the first holding magnet 212 and the north pole of the slider magnet 210 are sufficiently close enough to each other to exert a magnetic attraction force on each other, thus holding the slider 202 in the open position. Similarly, the second holding magnet 214 is disposed or fixed relative to the bezel 204, or fixedly coupled to the bezel 204, such that its north pole is closer to the slider magnet 210 than its south pole. Correspondingly, the slider magnet 210 is disposed or fixed on the slider 202 so that its south pole is disposed closer to the second holding magnet 214 than its north pole. Therefore, when the slider 202 is disposed in the closed position as illustrated in FIG. 2B, the south pole of the slider magnet 210 and the north pole of the second holding magnet 214 are sufficiently close enough to each other to exert a magnetic attraction force on each other, thus holding the slider 202 in the closed position. It should be noted that the illustrated orientations of the first and second holding magnets 212, 214, and the slider magnet 210 are just one example of a way in which both of the first and second holding magnets 212, 214 can be attracted to the slider magnet 210. In other examples, all the orientations, i.e., polarities, may be reversed to achieve the same effect, or yet different orientations and magnetic components, e.g., electromagnets, may be utilized to achieve the same effect.

Referring still to FIGS. 2A-2B, the view shutter 200 may further include an actuator 216, which may be used to switch the slider 202 between the open and closed positions. In some implementations, the actuator may be a separate, discrete component from the rest of the view shutter 200. I.e., the actuator may be a standalone component used in conjunction with the view shutter 200, or with a display portion or electronic device in which the view shutter 200 may be implemented. In some implementations, the actuator 216 may be a magnet or be constructed of a magnetic or ferromagnetic material. In further implementations, the actuator 216 may emit its own magnetic field, or may be a material that is affected by or responds to a magnetic field, e.g., an iron alloy. In yet further implementations, the actuator 216 may be a magnet or metallic item that is part of or may be embedded in another component or item, for example a stylus or pen having metallic or magnetic pieces. In other implementations, the actuator 216 may be any metallic item, or even an everyday item that is affected my magnetic fields, for example a paperclip, letter opener, etc. In other words, in some examples, a user may be able to pick up any convenient metallic item like a paperclip, letter opener, etc., and use such item to actuate the view shutter.

In order to transition the slider 202, for example, from the open position to the closed position, the actuator 216 may be brought into proximity with the slider magnet 210, for example, along an example direction 207 (although approach from any direction is possible and contemplated). The actuator 216 may move the slider magnet 210, and thus the slider 202, between the open and closed positions upon being brought sufficiently close to the slider magnet 210 so as to exert a magnetic force on the slider magnet 210, or be affected by the magnetic field of the slider magnet 210. In other words, the actuator 216 may be brought close enough to the slider magnet 210 so as to be attracted to the slider magnet 210 through magnetic force. Further, the actuator 216 may be brought close enough to the slider magnet 210 such that the attractive force between the slider magnet 210 and the actuator 216 is greater than the attractive force between the slider magnet 210 and the first holding magnet 212. Thus, the actuator 216 can then move in a closing direction, for example direction 205a, and the magnetic attraction between the actuator 216 and the slider magnet 210 will cause the slider magnet 210, and thus the slider 202 itself, to move in a corresponding closing direction 205b, against the magnetic urging of the first holding magnet 212. The actuator 216 may magnetically pull the slider magnet 210 and the slider 202 until the slider 202 is disposed in the closed position, and retained there by magnetic attraction with the second holding magnet 214, as described above. It should be noted that, while not illustrated, the actuator 216 may also be used to move the slider 202 from the closed position to the open position in a similar manner. In other words, the actuator 216 can magnetically pull the slider magnet 210 in an opening direction, opposite to direction 205a, against the magnetic urging of the second holding magnet 214, to cause the slider 202 to move in a corresponding opening direction, opposite to direction 205b, to the open position, wherein the slider 202 is retained by the first holding magnet 212.

Figure 3:
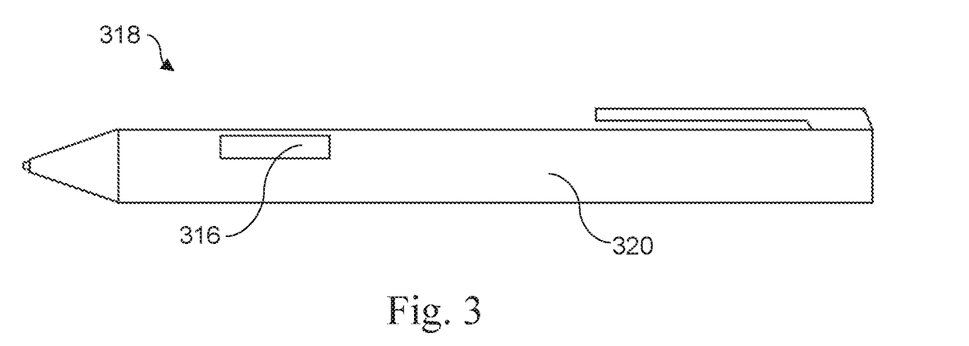
FIG. 3 is a front view of an accessory having an example actuator for an example view shutter.

Referring now to FIG. 3, a front view of an example actuator 316 is illustrated. The actuator 316 may be similar in structure and function to actuator 216. FIG. 3 depicts actuator 316 as being attached to or embedded within an accessory 318 for an electronic device. In some implementations, the accessory 318 may be a stylus 320 for use with a touch-screen electronic device. Further, the actuator 316 may be a magnet or magnetic material or element that may have a stronger magnetic attraction to a slider magnet on a slider of an example view shutter, than such a slider magnet may have with a first and second holding magnet. Embedding or attaching the actuator 316 to an accessory 318 may ensure that a user can conveniently have access to the actuator 316 in order to move the slider from the open position to the closed position, and vice versa. Note, this is only one example of an accessory in which the actuator 316 may be embedded. Other examples can include, but are not limited to, other peripheral devices or even other common desktop items having metallic materials. Also, in other implementations, the actuator 316 may be a standalone metallic component, e.g., a paperclip, binder clip, pen, or other suitable component.

Figure 4A:
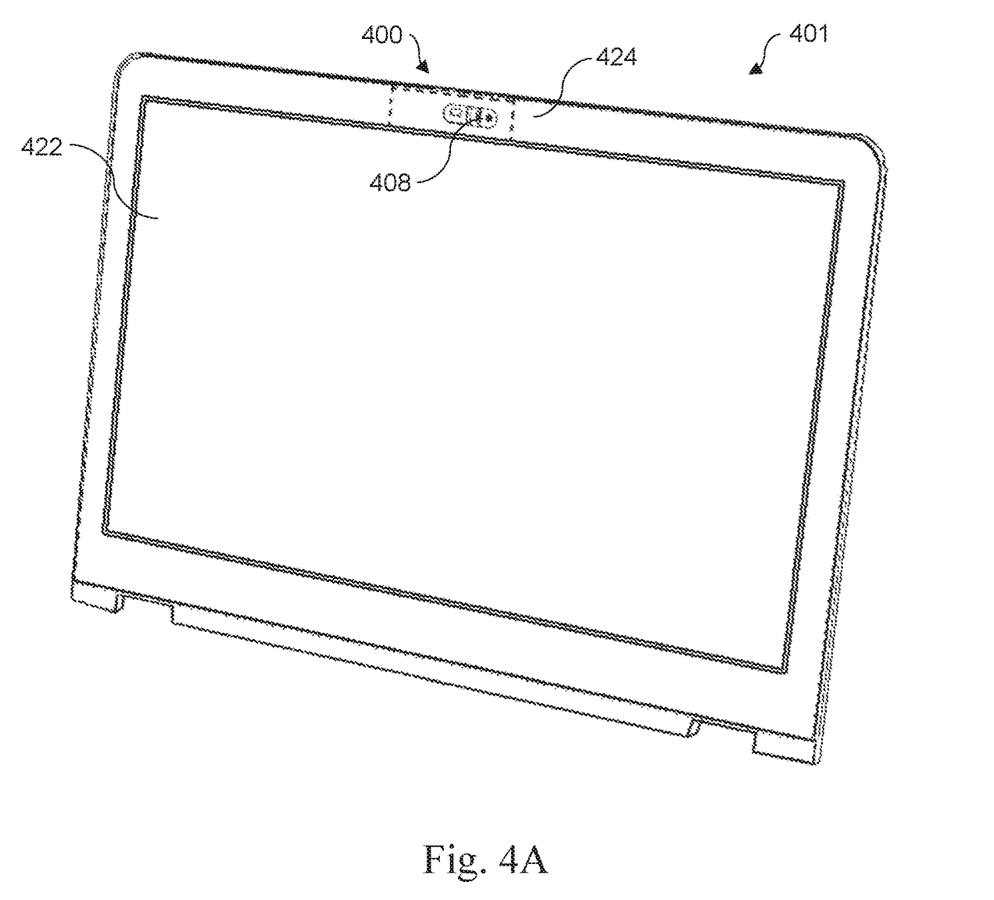
FIG. 4A is a perspective view of a display portion having an example view shutter with a slider magnet.

Referring now to FIG. 4A, a perspective view of an example display portion 401 for an electronic device having an example view shutter 400 is illustrated. View shutter 400 is illustrated in phantom lines as it is hidden behind a bezel 424 of the display portion 401. In other words, a slider of the view shutter 400 may be disposed behind the bezel 424, within the display portion 401. Example view shutter 400 may be similar to other example view shutters described above. Further, the similarly-named elements of example view shutter 400 may be similar in function and/or structure to the respective elements of other example view shutters, as they are described above. The example display portion 401 may have a display 422 on which graphics, user interfaces, videos, images, or other display information may be portrayed. The display portion 401 may also have a bezel 424 surrounding the display 422. In some implementations, the display 422 may be a touch-screen display. The bezel 424 may have a bezel aperture. The bezel 424, in some implementations, may be a non-display area which may block or hide parts, circuitry, or other components of the display portion 401 disposed around the display 422. In some implementations, the bezel 424 may only surround a portion of the display 422, for example if the display is an edge-to-edge display, or in further implementations, the bezel 424 may extend along at least a portion of a side of the display 422. The display portion 401 may also include a camera 408, which may be a front-facing camera. The camera 408 may be disposed behind the bezel 424 and aligned with the bezel aperture, through which the camera 408 may capture images or video. It should be noted that, although the display portion 401 is illustrated as potentially being a part of a notebook computer, the display portion 401 could also be a part of another type of electronic device, for example, a tablet computer, a mobile phone, a computer monitor or terminal, a desktop computer, or any other electronic device having a camera.

Figure 4B:
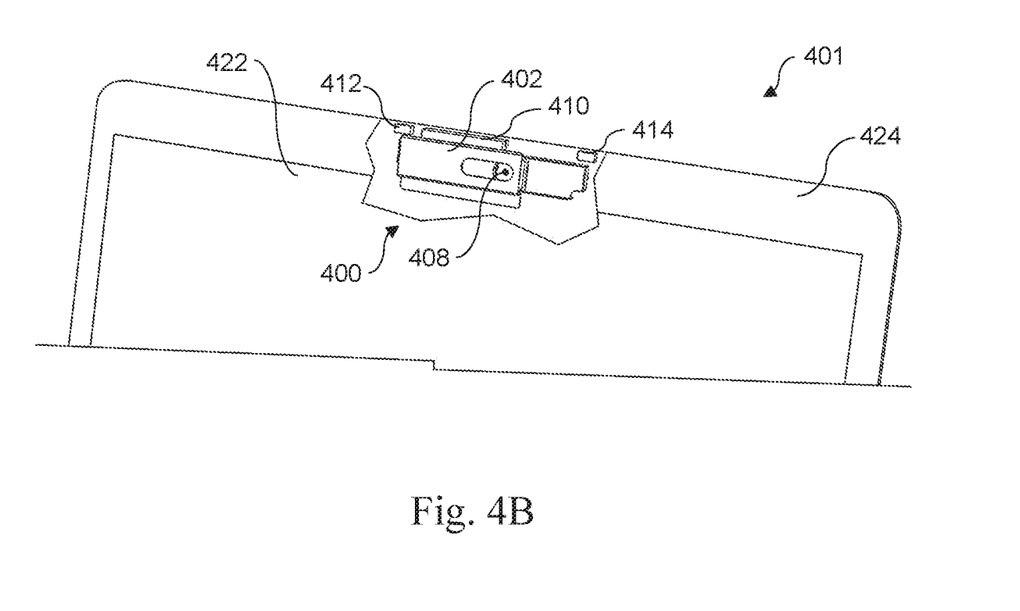
FIG. 4B is a perspective view of a display portion having an example view shutter with a slider magnet.
Figure 4C:
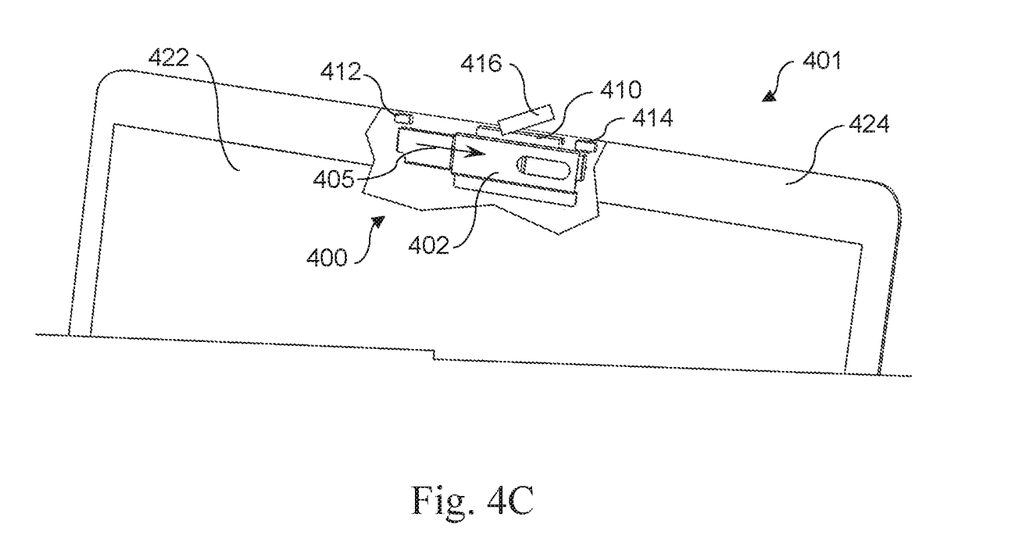
FIG. 4C is a perspective view of a display portion having an example view shutter with a slider magnet.

Referring now to FIGS. 4B-4C, perspective cutaway views of the display portion 401 are illustrated. Parts of the bezel 424 and the display 422 are cut away in order to illustrate the example view shutter 400 disposed behind them. The example view shutter 400 may include a slider 402 disposed in between the bezel 424 and the camera 408, or a portion or lens thereof, and also a first holding magnet 412 and a second holding magnet 414. The slider 402 may have a slider magnet 410 and a camera aperture disposed on the slider 402. The slider 402 may be moved along the bezel 424 from an open position, illustrated in FIG. 4B, wherein the camera may be able to capture images and video through the camera aperture and the bezel aperture, and a closed position, illustrated in FIG. 4C, wherein the slider 402 may be disposed in front of the camera 408, or a lens thereof, so as to obstruct a view of the camera through the bezel aperture and prevent the camera from capturing images or video through the bezel aperture.

The slider 402 may be moved between the open and closed positions by an actuator 416. For example, referring to FIG. 4C, the actuator 416 may be brought into proximity with the slider magnet 410 and then moved along a closing direction 405, along which the actuator 416 may pull the slider magnet 410, and thus the slider 402, through magnetic attraction. The actuator 416 may move the slider 402 back to the open position in a similar manner.

Figure 4D:
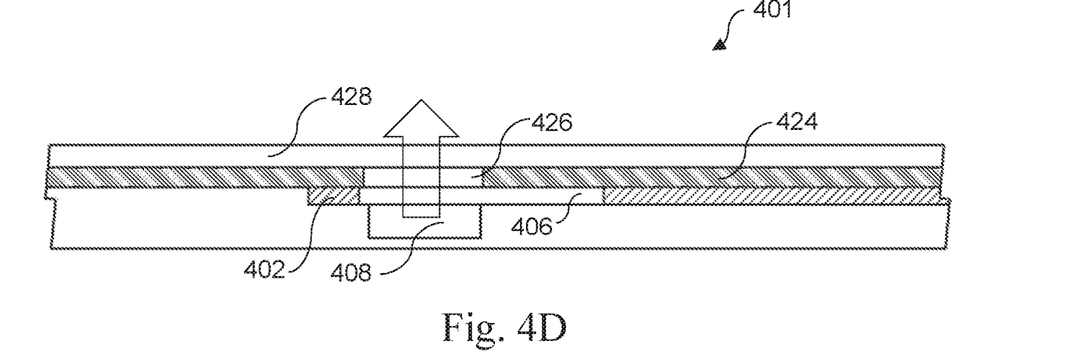
FIG. 4D is a section view of a display portion having an example view shutter with a slider magnet.
Figure 4E:
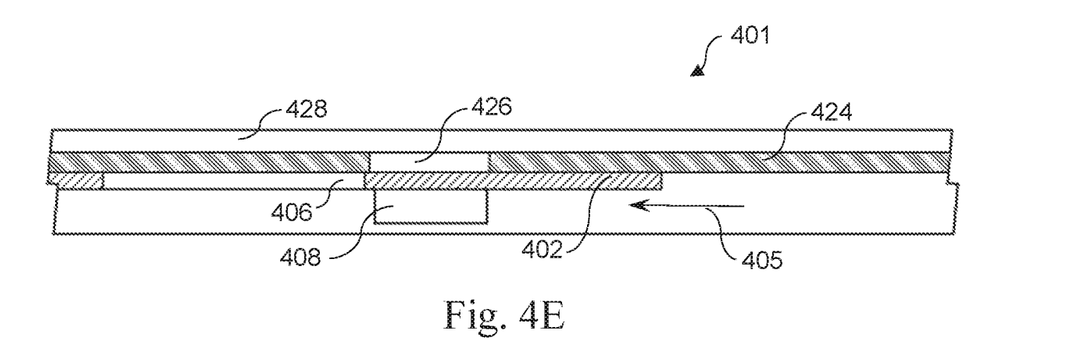
FIG. 4E is a section view of a display portion having an example view shutter with a slider magnet.

Referring now to FIGS. 4D and 4E, schematic section views of the example display portion 401 are illustrated as taken from the top of the display portion 401 looking down. Additionally, slider magnet 410 and first and second holding magnets 412, 414 are omitted for simplicity. FIG. 4D illustrates the slider 402 in the open position, and FIG. 4E illustrates the slider 402 in the closed position. When in the open position, the camera aperture 406 is aligned with the camera 408 and the bezel aperture 426. The bezel aperture 426 may be an opening, cutout, or window through which the camera 408 may be able to capture images and/or video. Thus, when the slider 402 is in the open position, the camera 408 may have an unobstructed view through the bezel aperture 426, as indicated by the arrow in FIG. 4D. Conversely, when the slider 402 is in the closed position, the camera aperture 406 is not in alignment with the camera 408 and the bezel aperture 426. Thus, the slider 402 is disposed in between the camera 408, or a lens thereof, and the bezel aperture 426, thereby blocking the camera 408 from capturing images and/or videos through the bezel aperture 426.

In some implementations, the display portion 401 may further include a cover glass 428. The cover glass 428 may be disposed over the display, the bezel 424, and the bezel aperture 426, with the bezel 424 disposed in between the cover glass 428 and the slider 402. The camera 408 may be disposed behind the cover glass and the bezel 424. Thus, the cover glass 428 may extend uninterrupted over the portion of the display portion 401 in which the camera 408 and the slider 402 are disposed, without having a need for a cutout in the cover glass to accommodate the slider 402.

Figure 5A:
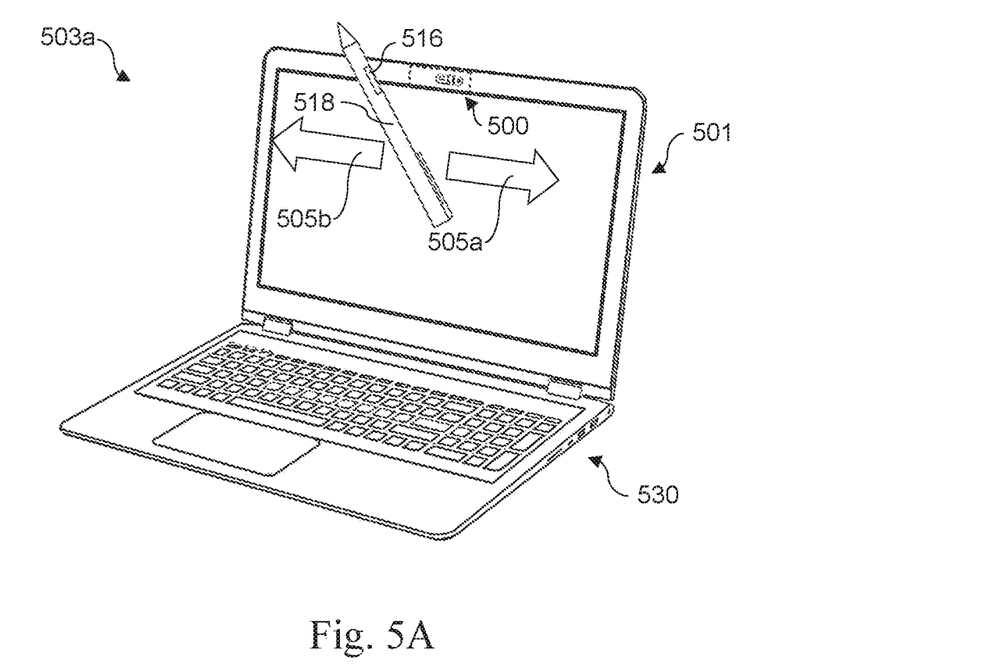
FIG. 5A is a perspective view of an electronic device having an example view shutter with a slider magnet.
Figure 5B:
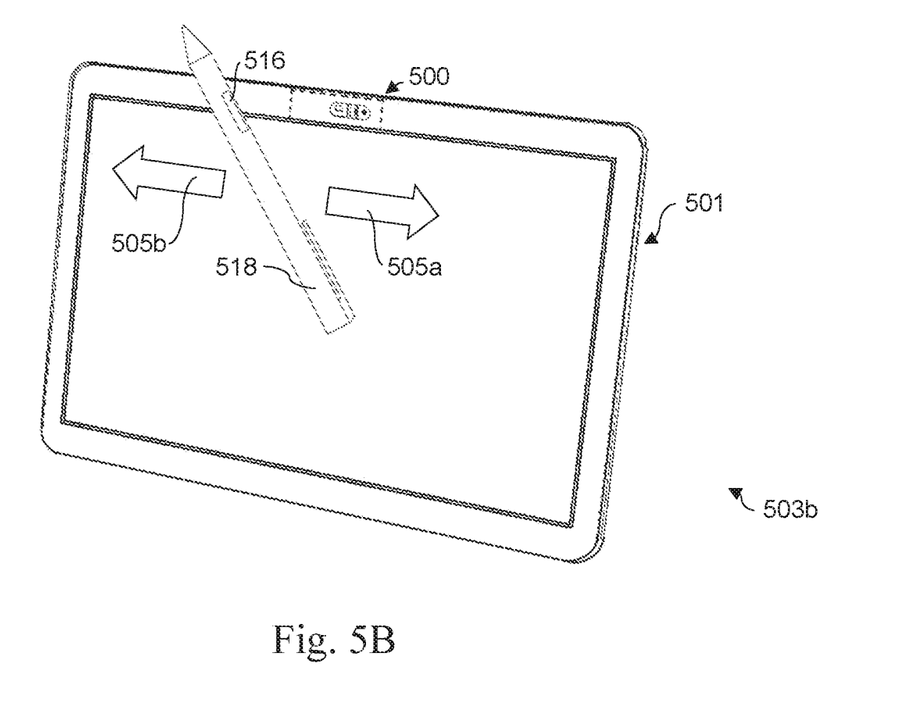
FIG. 5B is a perspective view of an electronic device having an example view shutter with a slider magnet.

Referring now to FIGS. 5A-5B, perspective views of electronic devices 503a and 503b (referred to collectively as electronic devices 503) having an example view shutter 500 are illustrated. Example view shutter 500 may be similar to other example view shutters described above. Further, the similarly-named elements of example view shutter 500 may be similar in function and/or structure to the respective elements of other example view shutters, as they are described above. View shutter 500 may have a slider and a slider magnet, as well as a first and second holding magnet, as is discussed above. The electronic device 503a may have a display portion 501 having a display and a bezel, as well as an input portion 530 hingeably engaged with the display portion 501 such that the display portion 501 and the input portion 530 form a notebook computer. The electronic device 503b may also have a display portion 501 but not an input portion. Thus, electronic device 503b may represent a tablet computer. The display portion 501 of either electronic device may include a touch-screen display and/or a cover glass. It should be noted that FIGS. 5A-5B illustrate examples, and that the electronic devices 503 may be another type of electronic device having a camera besides a notebook computer and a tablet computer.

The slider of the view shutter 500 may be disposed behind the bezel of the display portion 501, and is thus illustrated in phantom lines, and disposed in front of a camera embedded behind the bezel. The slider may be movable between an open position and a closed position, wherein a camera aperture of the slider may expose the camera to a bezel aperture, allowing images and video to be captured by the camera through the bezel aperture when the slider is in the open position, and the slider may block the camera from being able to capture images and video through the bezel aperture when the slider is disposed in the closed position.

The electronic devices 503 may include an accessory 518 having an actuator 516. In some implementations, the accessory may be a stylus. The actuator 516 may be a magnetic component and may have a sufficient magnetic attraction to the slider magnet when in close proximity to the slider magnet so as to move the slider between the open position and the closed position through magnetic force. In other words, when desiring to move the slider to the closed position and prevent unauthorized or unwanted image and/or video capture by the camera, a user can pick up the accessory 518 and put it in close proximity to the view shutter 500 and move the accessory, for example, in a similar manner to direction 505a. Similarly, if the user desires to utilize the camera, the user may pick up the accessory, place it in proximity to the view shutter, and move the accessory, for example, in a similar manner to direction 505b.

Example view shutters described herein provide an internally-integrated shutter which may be easily and reliably actuated by a user to prevent unauthorized image and video capture from a front-facing camera. The internal nature of view shutter examples described herein provide and maintain the positive industrial design and aesthetic of the electronic devices. Further, the holding magnets described herein retain the slider of the example view shutters in the desired position.

What is claimed is:

1. A view shutter, comprising:
   a slider to move along a bezel of an electronic device between an open position and a closed position;
   a camera aperture disposed on the slider, the camera aperture to be aligned with a camera disposed behind the slider if the slider is in the open position, and the slider to obstruct a view of the camera if in the closed position;
   a slider magnet disposed on the slider; and
   a first holding magnet coupled to the bezel and a second holding magnet coupled to the bezel.

2. The view shutter of claim 1, wherein the camera aperture is to be moved out of alignment with the camera as the slider is moved from the open position to the closed position.

3. The view shutter of claim 1, wherein the first holding magnet and the second holding magnet are fixedly coupled to the bezel such that the slider and slider magnet move relative to the bezel, the first holding magnet, and second holding magnet.

4. The view shutter of claim 1, wherein the first holding magnet and the second holding magnet are oriented so as to both be magnetically attracted to the slider magnet.

5. The view shutter of claim 4, wherein the first holding magnet is to hold the slider in the open position through magnetic attraction to the slider magnet if the slider is disposed in the open position, and the second holding magnet is to hold the slider in the closed position through magnetic attraction to the slider magnet if the slider is disposed in the closed position.

6. The view shutter of claim 1, wherein the slider is disposed behind the bezel, within a display portion of the electronic device.

7. The view shutter of claim 6, wherein the bezel is disposed in between the slider and a cover glass of the display portion.

8. The view shutter of claim 1, further comprising an actuator to move the slider magnet, and thus the slider, between the open and closed positions via a magnetic force.

9. A display portion for an electronic device, comprising:
   a display having a bezel;
   a bezel aperture disposed in the bezel;
   a camera disposed behind the bezel and aligned with the bezel aperture; and
   a view shutter, comprising:
      a slider disposed in between the bezel and the camera, the slider to move along the bezel between an open position and a closed position;
      a camera aperture disposed on the slider, the camera aperture to be aligned with the camera and the bezel aperture if the slider is in the open position, and the slider to obstruct a view of the camera through the bezel aperture if the slider is in the closed position;
      a slider magnet fixed to the slider; and
      a first holding magnet fixedly coupled to the bezel and a second holding magnet fixedly coupled to the bezel,
   wherein the slider magnet is magnetically attracted to both the first holding magnet and the second holding magnet.

10. The display portion of claim 9, wherein the first holding magnet is to hold the slider in the open position through magnetic attraction to the slider magnet if the slider is disposed in the open position, and the second holding magnet is to hold the slider in the closed position through magnetic attraction to the slider magnet if the slider is disposed in the closed position.

11. The display portion of claim 9, further comprising a cover glass disposed over the display and the bezel, the bezel disposed in between the cover glass and the slider.

12. The display portion of claim 9, further comprising a touch-screen display.

13. An electronic device, comprising:
   a display portion, comprising:
      a display having a bezel;
      a bezel aperture disposed on the bezel;
      a cover glass covering the display, the bezel, and the bezel aperture; and
      a camera disposed behind the bezel;
   a view shutter, comprising:
      a slider disposed in between the bezel and the camera, the slider movable between an open position, exposing the camera, and a closed position, blocking the camera;
      a camera aperture disposed on the slider;
      a slider magnet fixed to the slider; and
      a first holding coupled to the bezel, and a second holding magnet coupled to the bezel; and
   a stylus having a magnetic actuator attracted to the slider magnet.

14. The electronic device of claim 13, further comprising an input portion hingeably engaged with the display portion such that the display portion and the input portion form a notebook computer.

15. The electronic device of claim 13, wherein the electronic device is a tablet computer and the display portion comprises a touch-screen display.

* * * * *